United States Patent
Tajima et al.

(10) Patent No.: US 7,501,787 B2
(45) Date of Patent: Mar. 10, 2009

(54) METHOD FOR CONTROLLING AC MOTOR

(75) Inventors: Hirokazu Tajima, Mie (JP); Yasuaki Hachisu, Mie (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 123 days.

(21) Appl. No.: 11/633,097

(22) Filed: Dec. 4, 2006

(65) Prior Publication Data
US 2007/0145939 A1     Jun. 28, 2007

(30) Foreign Application Priority Data
Dec. 2, 2005     (JP) ................ 2005-349333

(51) Int. Cl.
*H02P 27/00* (2006.01)
*H02P 27/04* (2006.01)
(52) U.S. Cl. ............. 318/802; 318/430; 318/806; 318/808
(58) Field of Classification Search ........ 318/724, 318/778, 779, 801, 808
See application file for complete search history.

(56) References Cited

U.S. PATENT DOCUMENTS 5,461,296 A * 10/1995 Messersmith et al. ....... 318/779
5,635,811 A *  6/1997 Rebhan et al. ............. 318/778
5,914,582 A *  6/1999 Takamoto et al. .......... 318/801
6,060,860 A    5/2000 Itoh et al.

FOREIGN PATENT DOCUMENTS

| EP | 1 195 611 A1 | 4/2002 |
| JP | 11-075394 | 3/1999 |
| JP | 11-346500 | 12/1999 |
| JP | 3636340 | 1/2005 |

OTHER PUBLICATIONS

The Electrical Engineering Handbook, p. 578, Institute of Electrical Engineers of Japan, Tokyo, 2001.

* cited by examiner

*Primary Examiner*—Paul Ip
(74) *Attorney, Agent, or Firm*—Rabin & Berdo, PC

(57) ABSTRACT

An inverter that supplies a desired primary voltage ($v_1$) to an induction motor, a current detector that detects a primary current ($i_1$) from the inverter to the induction motor, a voltage designation value calculating unit that generates a voltage designation value ($v_1^*$) for generating the voltage $v_1$, an idling-time speed estimating unit that calculates an estimate value ($\omega_r^{\#}$) of the rotation speed when the induction motor is idling, and a sequence circuit that commands the operations of these units are provided. The idling-time speed estimating unit switches a method for deriving the estimate value on the basis of a current value in the case where a short circuit is generated between windings when the induction motor is idling.

4 Claims, 3 Drawing Sheets

METHOD FOR CONTROLLING AC MOTOR

BACKGROUND OF THE INVENTION

1. Field of the Invention

This invention relates to a method for controlling an AC motor in which variable-speed control of the AC motor is carried out while power is supplied to the AC motor from a variable-voltage variable-frequency inverter, and particularly to a method for deriving a rotation speed estimate value at the time of idling of the motor.

2. Description of the Related Art

Recently, the methods disclosed in Japanese Patent No. 3,636,340 and JP-A-11-346500 (equivalent to U.S. Pat. No. 6,060,860, which is hereby incorporated by reference) have become known as methods for controlling an AC motor when restarting in a state where a variable-voltage variable-frequency inverter that drives an AC motor (hereinafter simply referred to as inverter) is stopped and the AC motor is idling, for example, when restarting after recovery from a momentary service interruption of a commercial power source or the like that is an input power source of the inverter.

In the control method in which, when the AC motor is idling, at least one of the semiconductor switching devices forming a main circuit of the inverter is turned on and off to generate a short circuit between windings of the motor, and an estimate value of the rotation speed of the motor is calculated from a winding current value flowing at the time, for example, in the control method disclosed in Japanese Patent No. 3,636,340, an induced voltage of the AC motor at the time is used. Therefore, this method can be applied to a synchronous motor having a permanent magnetic field or an induction motor in which a residual voltage exists, but it cannot be applied to an induction motor in which a residual voltage is attenuated.

In the control method in which, when the AC motor is idling, an estimate value of the rotation speed of the motor is calculated from a voltage or current supplied from the inverter to the motor, for example, in the control method disclosed in JP-A-11-346500 (U.S. Pat. No. 6,060,860), if a residual voltage exists in the induction motor at the time, it affects the calculation of the rotation speed estimate value. Therefore, the calculation must be carried out after the residual voltage is sufficiently attenuated.

SUMMARY OF THE INVENTION

It is an object of this invention to provide a method for controlling an AC motor that enables estimation of the rotation speed of the motor, irrespective of the status when the AC motor is idling.

According to a first aspect of the invention, a method for controlling an AC motor in which variable-speed control of the AC motor is carried out while power is supplied to the AC motor from a variable-voltage variable-frequency inverter, includes: turning on and off at least one of the semiconductor switching devices forming a main circuit of the inverter to generate a short circuit between windings of the motor when the motor is idling; switching a method for deriving a rotation speed estimate value for the motor on the basis of a winding current value flowing at the time; and starting power supply from the inverter to restart the motor on the basis of the resultant rotation speed estimate value.

According to a second aspect of the invention, in the method for controlling an AC motor according to the first aspect of the invention, when the winding current value is equal to or higher than a predetermined lower limit value, the semiconductor switching device is turned on and off again to generate a short circuit between the windings of the motor, and a rotation speed estimate value for the motor is derived on the basis of both winding current values.

Moreover, according to a third aspect of the invention, in the method for controlling an AC motor according to the first or second aspect of the invention, when the winding current value is less than a predetermined lower limit value, a rotation speed estimate value for the motor is derived on the basis of a voltage or current that is newly supplied to the motor from the inverter.

According to this invention, at least one of the semiconductor switching devices forming the main circuit of the inverter is turned on and off to generate a short circuit between windings of the motor, and the method for deriving a rotation speed estimate value for the motor is switched between the case where the winding current value flowing at the time is equal to or higher than a predetermined lower limit value and the case where the winding current value is less than the lower limit value.

DETAILED DESCRIPTION OF THE PREFERRED EMBODIMENTS

Figure 1:
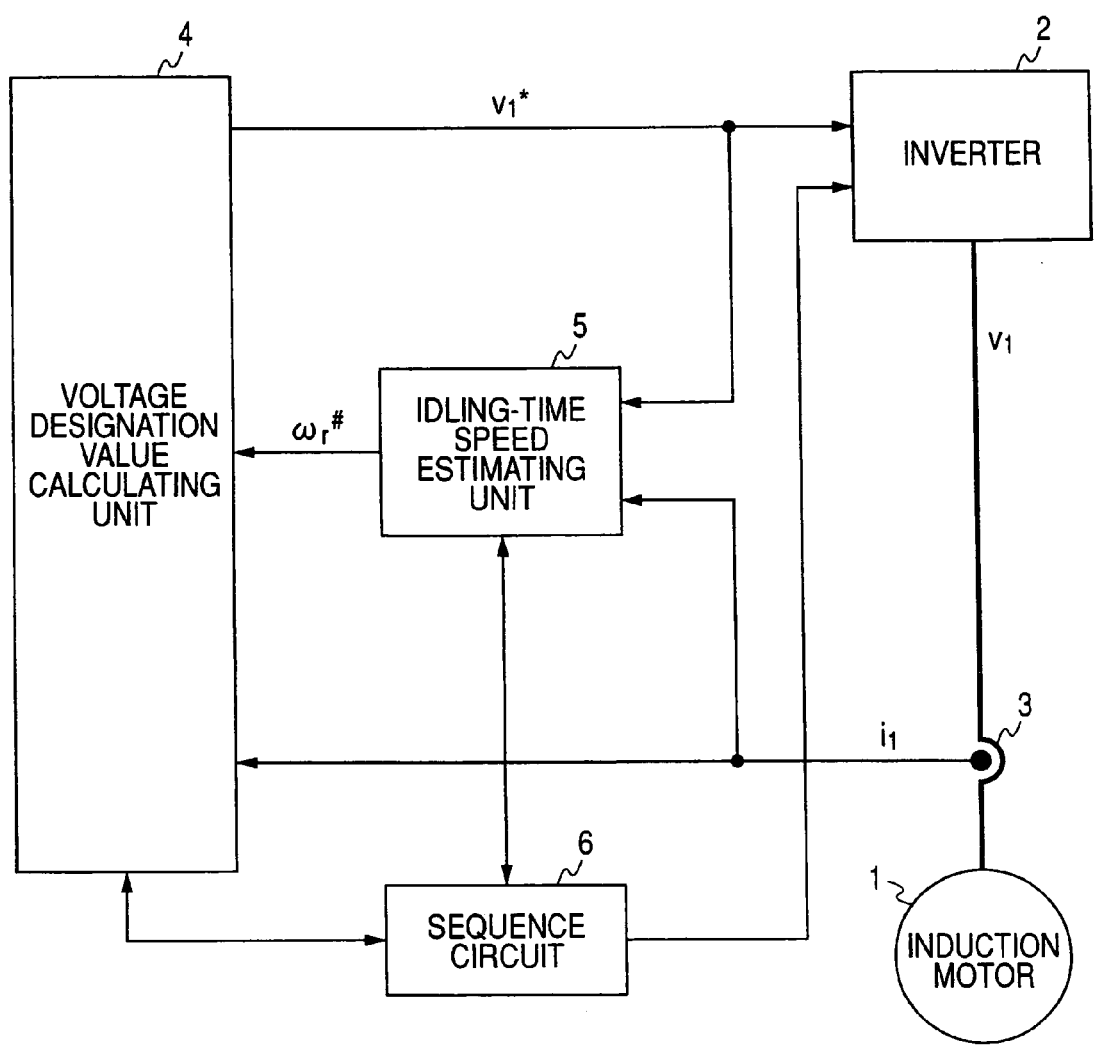
FIG. 1 is a circuit diagram showing an embodiment of this invention.

FIG. 1 is a circuit diagram showing an embodiment of this invention. Reference numeral 1 represents an induction motor as an example of an AC motor, although it will be appreciated by those skilled in the art that other types of motor may be used without departing from the scope of the invention, 2 represents an inverter that supplies a desired primary voltage ($v_1$) to the induction motor 1, 3 represents a current detector that detects a primary current ($i_1$) from the inverter 2 to the induction motor 1, 4 represents a voltage designation value calculating unit that generates a voltage designation value ($v_1^*$) for generating the above voltage $v_1$, 5 represents an idling-time speed estimating unit that calculates an estimate value ($\omega_r^\#$) of the rotation speed when the induction motor 1 is idling, and 6 represents a sequence circuit that commands the operations of the inverter 2, the voltage designation value calculating unit 4, the idling-time speed estimating unit 5 and the like.

The voltage designation value calculating unit 4 calculates each voltage designation value on a d-q axis from each current on the d-q axis as a result of performing coordinate transformation of the current $i_1$ of the induction motor 1 detected by the current detector 3 and a motor constant of the induction motor 1 on the basis of a primary angular frequency designation value ($\omega_1$) of the induction motor 1 designated from outside or the like and a phase angle designation value ($\theta_1$) acquired by time integration of $107_1$ as the normal operation of the induction motor 1 based on a sequence signal from the sequence circuit 6. The voltage designation value calculating unit 4 generates the above-described voltage $v_1$ by coordinate transformation of these values based on the above value $\theta_1$.

Figure 3:
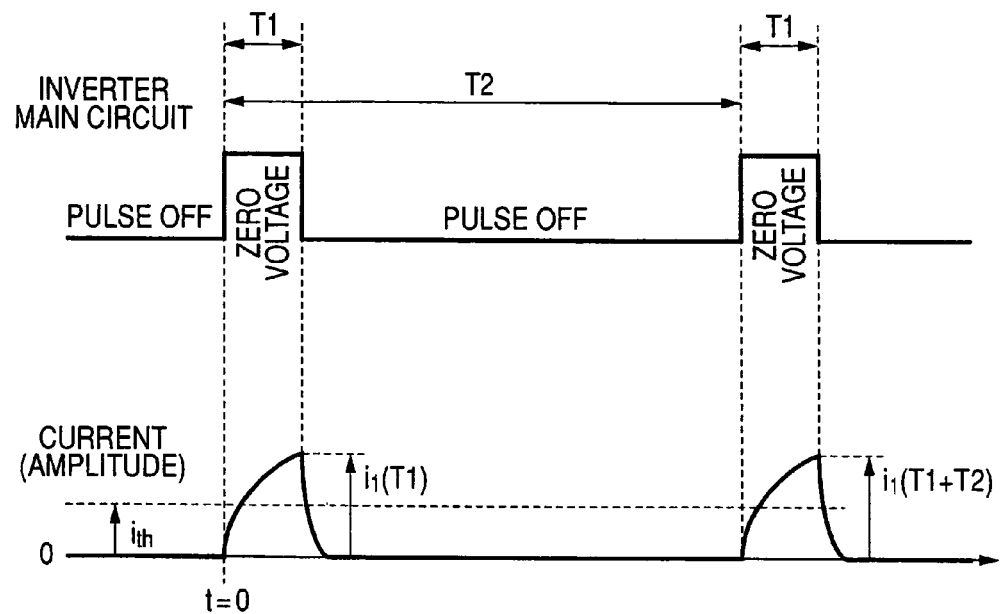
FIG. 3 shows a waveform for explaining the operation of FIG. 2.
Figure 4:
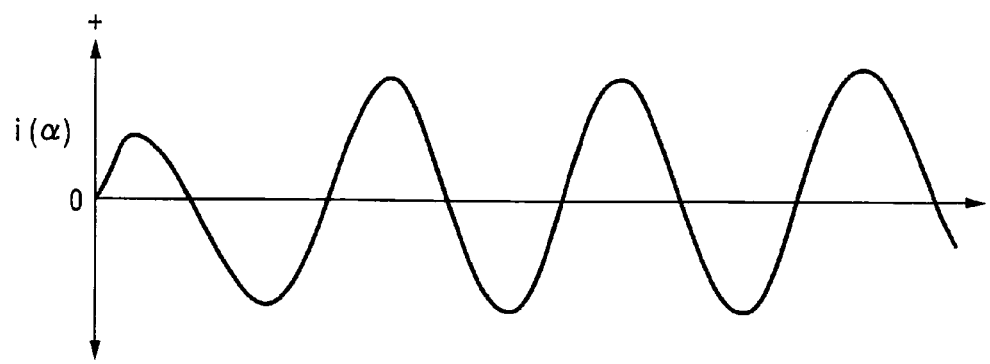
FIG. 4 shows a waveform for explaining the operation of FIG. 2.

Next, a method for deriving the above value $\omega_r^\#$ when the induction motor 1 is idling will be described hereinafter with reference to the flowchart of the operation of the idling-time speed estimating unit 5 shown in FIG. 2 and the operation waveforms shown in FIG. 3 and FIG. 4.

Figure 2:
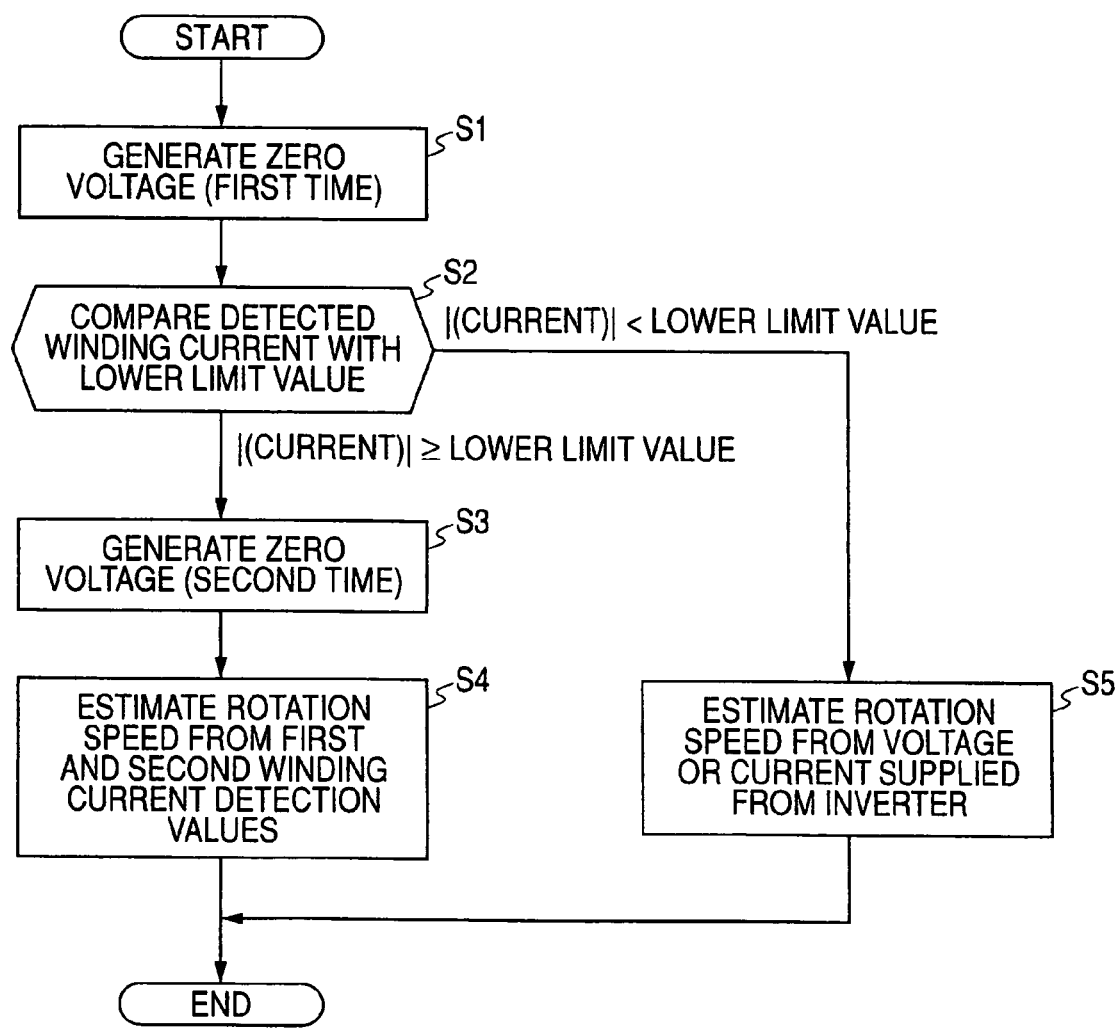
FIG. 2 is a flowchart for explaining the operation of FIG. 1.

In FIG. 2, for example, when the sequence circuit 6 detects a momentary service interruption of a commercial power or the like that is an input power source of the inverter 2 and turns off the pulse of the main circuit of the inverter 2, and then recovery from this momentary service interruption is detected, at least one of the semiconductor switching devices of the main circuit is turned on and off to generate a short circuit in a stator winding (for example, each semiconductor switching device on the upper arm of the main circuit is turned on and each semiconductor switching device on the lower arm is are turned off). Hereinafter, the state of these upper and lower arms is referred to as zero voltage (step S1). As the stator winding is short-circuited, a counter-electromotive force causes a current to flow through the winding. Therefore, a detection value $i_1(T1)$ of the winding current of the induction motor 1 detected by the current detector 3 immediately before the lapse of a zero-voltage period T1 is stored, as shown in FIG. 3, and the relation between this value and a lower limit value $i_{th}$ is determined (step S2). When $i_1(T1) \geq i_{th}$ holds, the pulse of the main circuit of the inverter 2 is turned off and the processing shifts to step S3. When $i_1(T1) < i_{th}$ holds, the pulse of the main circuit of the inverter 2 is turned off and the processing shifts to step S5.

Next, in step S3, after the lapse of a period T2 from the occurrence of the previous (first) zero voltage, a zero voltage state is set again (for a second time). As shown in FIG. 3, a detection value $i_1(T1+T2)$ of the winding current of the induction motor 1 detected by the current detector 3 immediately before the period of zero voltage after T2 passes T1 is stored (step S4). From values acquired by converting the stored values $i_1(T1)$ and $i_1(T1+T2)$ to an α-β axis, a current vector phase angle ($\Theta_1$) is calculated in accordance with the following equations (1) and (2).

$$\Theta_1(T1) = \tan^{-1}\{i_1\beta(T1)/i_1\alpha(T1)\} \quad (1)$$

$$\Theta_1(T1+T2) = \tan^{-1}\{i_1\beta(T1+T2)/i_1\alpha(T1+T2)\} \quad (2)$$

Conversion to an α-β axis may be performed, for example, as described in the Electrical Engineering Handbook, page 578, Institute of Electrical Engineers of Japan, Tokyo, 2001, hereby incorporated by reference.

From equations (1) and (2), the estimate value ($\omega_r^{\#}$) of the rotation speed of the induction motor 1 for (T1+T2) at the time is expressed by the following equation (3).

$$\omega_r^{\#}(T1+T2) = \{\Theta_1(T1+T2) - \Theta_1(T1)\}/T2 \quad (3)$$

In step S5, the detection value $i_1(T1)$ of the winding current of the induction motor 1 detected by the current detector 3 in the first zero-voltage period is less than the lower limit value $i_{th}$. As the estimate value ($\omega_r^{\#}$) of the rotation speed of the induction motor 1 is derived in accordance with equations (1) to (3) based on the current at the time of zero voltage, this value includes many errors. To avoid this, a voltage designation value to supply a voltage or current to the induction motor 1 is newly generated for a predetermined period from the voltage designation value calculating unit 4 to the inverter 2 in accordance with a command from the sequence circuit 6. Thus, the closed loop formed by the induction motor 1, the voltage designation value calculating unit 4 and the inverter 2 is self-oscillated. As the value acquired by converting to the α-β axis the detection value $i_1$ of the primary current of the induction motor 1 detected by the current detector 3 at the time, for example, one cycle of the sine-waveform of $i(\alpha)$ shown in FIG. 4, is measured, the measured value corresponds to the estimate value ($\omega_r^{\#}$) of the rotation speed of the induction motor 1 at the time.

That is, the primary voltage having the voltage and frequency based on the rotation speed estimate value for the induction motor 1 acquired by the idling-time speed estimating unit 5 when the induction motor 1 is idling is supplied to the induction motor 1 from the inverter 2, thereby enabling restart of the induction motor 1 without causing any shock.

In the above embodiment, the case of using the induction motor is described. However, also when a permanent magnet synchronous motor is used, the control method according to this invention enables restart of the synchronous motor at the time of idling without causing any shock.

It will be appreciated by those skilled in the art that the invention may be practiced otherwise than as specifically described in the preferred embodiments without departing from the scope thereof.

What is claimed is:

1. A method of controlling an AC motor in which variable-speed control of the AC motor is carried out while power is supplied to the AC motor from a variable-voltage variable-frequency inverter, the method comprising:
   turning on and off at least one of semiconductor switching devices forming a main circuit of the inverter to generate a short circuit between windings of the motor at a time when the motor is idling;
   selecting a way of deriving a rotation speed estimate value for the motor on the basis of a winding current value flowing at the time; and
   starting power supply from the inverter to restart the motor on the basis of the resultant rotation speed estimate value.

2. The method according to claim 1, wherein when the winding current value is equal to or higher than a predetermined lower limit value, the semiconductor switching device is turned on and off again to generate a short circuit between the windings of the motor, and a rotation speed estimate value for the motor is derived on the basis of both winding current values.

3. The method according to claim 2, wherein when the winding current value is less than a predetermined lower limit value, a rotation speed estimate value for the motor is derived on the basis of a voltage or current that is newly supplied to the motor from the inverter.

4. The method according to claim 1, wherein when the winding current value is less than a predetermined lower limit value, a rotation speed estimate value for the motor is derived on the basis of a voltage or current that is newly supplied to the motor from the inverter.

* * * * *